United States Patent

Murayama et al.

[11] Patent Number: 5,227,252
[45] Date of Patent: Jul. 13, 1993

[54] ELECTROLUMINESCENT DEVICE

[75] Inventors: Ryuji Murayama; Takeo Wakimoto; Hitoshi Nakada, all of Saitama; Masaharu Nomura; Giichi Sato, both of Tokyo, all of Japan

[73] Assignees: Pioneer Electronic Corporation; Nippon Kayaku Kabushiki Kaisha, both of Tokyo, Japan

[21] Appl. No.: 643,985

[22] Filed: Jan. 22, 1991

[30] Foreign Application Priority Data

Jan. 22, 1990 [JP] Japan .................. 2-12292
Aug. 30, 1990 [JP] Japan .................. 2-228852

[51] Int. Cl.$^5$ ............... H05B 33/00; H05B 33/14
[52] U.S. Cl. ................... 428/690; 428/917; 250/486.1; 313/504
[58] Field of Search ............ 313/504; 428/690, 917; 250/486.1

[56] References Cited

U.S. PATENT DOCUMENTS

| | | | |
|---|---|---|---|
| 4,032,226 | 6/1977 | Groner | 355/3 P |
| 4,769,292 | 9/1988 | Tang et al. | 428/917 |
| 4,793,691 | 12/1988 | Enomoto et al. | 350/339 F |
| 4,950,950 | 8/1990 | Perry et al. | 313/504 |

FOREIGN PATENT DOCUMENTS 63-264692 11/1988 Japan .

Primary Examiner—Ellis P. Robinson
Assistant Examiner—Charles R. Nold
Attorney, Agent, or Firm—Keck, Mahin & Cate

[57] ABSTRACT

Electroluminescent device with improved luminous efficiency, where a fluorescent emitting layer and a positive-hole transporting layer are layered on each other and arranged between a cathode and an anode, the two layers comprising organic compounds and the fluorescent emitting layer being composed of quinoline derivative as a host material, characterized by containing in the fluorescent emitting layer, as a guest material, a quinacridone compound of the following formula (A);

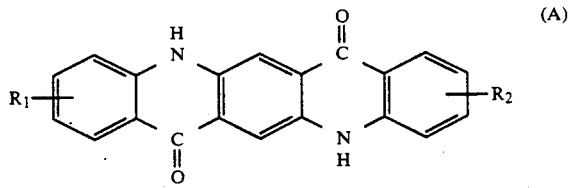

wherein $R_1$ and $R_2$ are independently hydrogen, methyl group or chlorine or the dehydro form of the quinacridone compound.

6 Claims, 4 Drawing Sheets

EMISSION

EMISSION

EMISSION

ELECTROLUMINESCENT DEVICE

BACKGROUND OF THE INVENTION

1. Field of the Invention

The present invention relates to an electroluminescent device, more specifically to an electroluminescent device consisting of organic compounds as emitter.

2. Description of the Prior Art

As such type of electroluminescent devices, there have been known a two-layer structure, as is shown in FIG. 1, in which an organic fluorescent film 3 and an organic positive-hole transporting layer 4 are arranged between a metal electrode 1 as cathode and a transparent electrode 2 as anode, the two layers both comprising organic compounds and being layered on each other, and a three-layer structure, as is shown in FIG. 2, in which an organic electron transporting layer 5, an organic fluorescent film 3 and an organic positive-hole transporting layer 4, are arranged between a metal electrode 1 and a transparent electrode 2. The organic positive-hole transporting layer 4 herein has a function to facilitate the injection of positive holes from an anode as well as another function to block electrons, while the organic electron transporting layer 5 has a function to facilitate the injection of electrons from a cathode.

In these electroluminescent devices where a glass substrate 6 is arranged outside the transparent electrode 2, excitons are generated from the recombination of the electrons injected from the metal electrode 1 with the positive holes injected to the organic fluorescent film 3 from the transparent electrode 2. At the stage where the excitons are inactivated through radiation, they emit light which is then emitted toward outside through the transparent electrode 2 and the glass substrate 6.

As is disclosed in the Japanese Patent Laid-open No. 264692/1988, there have been also known stably emitting electroluminescent devices comprising a fluorescent film formed from an organic host material and a fluorescent guest material. Although the conventional electroluminescent devices with such aforementioned composition comprising organic compounds, can emit light at a lower voltage, there is a desire toward electroluminescent devices capable of emission at a high luminance.

SUMMARY OF THE INVENTION

The present invention is intended to provide electroluminescent devices capable of emission at a high luminance for a long period of time.

The electroluminescent devices of the present invention wherein a fluorescent emitting layer and a positive-hole transporting layer are arranged between a cathode and an anode, the two layers being layered on each other, and the fluorescent emitting layer comprises a quinoline derivative, is characterized by containing, in the fluorescent emitting layer, a quinacridone compound in the structure of the following formula (A);

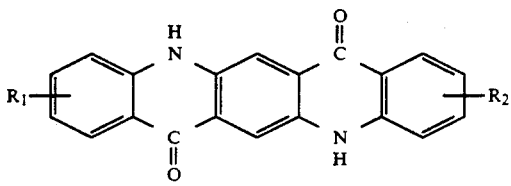

(A)

where $R_1$ and $R_2$ are independently hydrogen, methyl group or chlorine (Quino[2,3-b] acridine-5,12-dihydro-7,14-dione).

The electroluminescent devices of the present invention wherein a fluorescent emitting layer and a positive-hole transporting layer are arranged between a cathode and an anode, the two layers being layered on each other and the fluorescent emitting layer comprises a quinoline derivative, is characterized by containing, in the fluorescent emitting layer, the dihydride form of a quinacridone compound in the structure of the following formula (C);

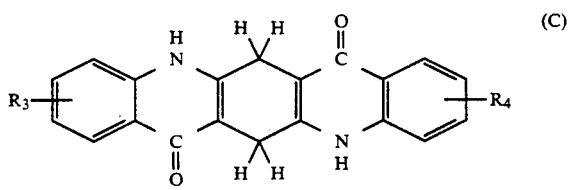

(C)

where $R_3$ and $R_4$ are independently hydrogen, methyl group or chlorine (Quino[2,3-b] acridine-5,6,12,13-tetrahydro-7,14-dione).

The present invention will now be explained in detail with reference to drawings.

DETAILED DESCRIPTION OF PREFERRED EMBODIMENT

Figure 1:
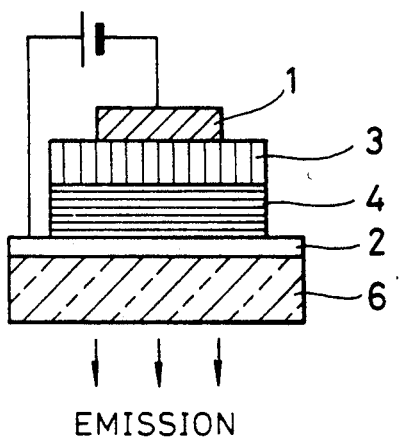
FIGS. 1 and 2 are figures representing the structures of organic compound electroluminescent devices.

Similar to the organic electroluminescent device of the structure shown in FIG. 1, the electroluminescent device in accordance with the present invention, is formed into a film, by layering a fluorescent emission layer and a positive-hole transporting layer between a pair of electrodes, the two layers comprising organic compounds and being in the form of film.

The aluminum complex of 8-hydroxyquinoline, namely tris(8-quinolinol)aluminum in the following structure of the formula (B);

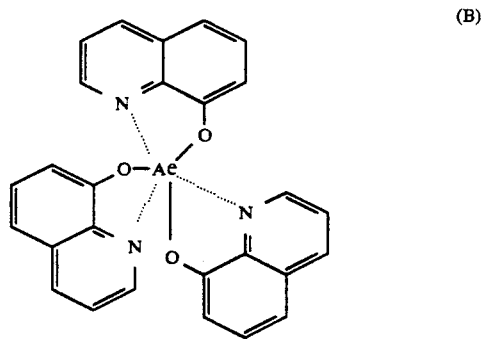

(B)

is preferably used as a quinoline derivative, a host material of the fluorescent emitting layer; in addition to it, there are used, for example, bis(8-quinolinol) magnesium, bis(benzo{f}-8-quinolinol)zinc, bis (2-methyl-8-quinolinolate)aluminum oxide, tris(8-quinolinol)indium, tris(5-methyl-8-quinolinol)aluminum, 8-quinolinol lithium, tris(5-chloro-8-quinolinol)gallium, bis(5-chloro-8-quinolinol)calcium, and poly[zinc(II)-bis(8-hydroxy-5-quinolinyl)methane].

As the guest material in the fluorescent emitting layer, it is preferable to use a quinacridone compound of the following formula (A);

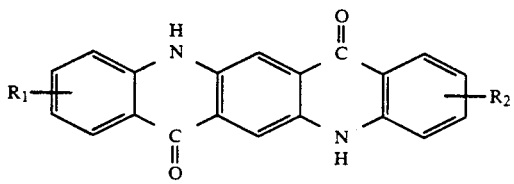
(A)

wherein $R_1$ and $R_2$ are independently hydrogen, methyl group or chlorine, more specifically to use quinacridone of the following formula (A1);

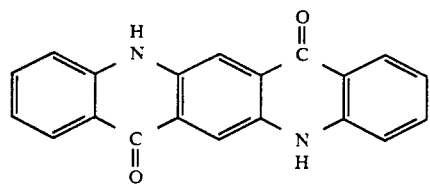
(A1)

As the guest material in the fluorescent emitting layer, it is preferable to use the dihydro form of a quinacridone compound of the following formula (C);

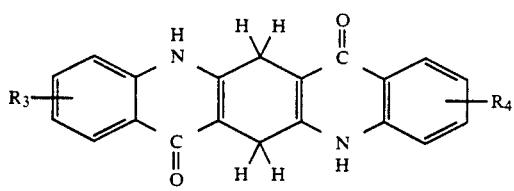
(C)

wherein $R_3$ and $R_4$ are independently hydrogen, methyl group or chlorine, more specifically to use quinacridone of the following formula (C1);

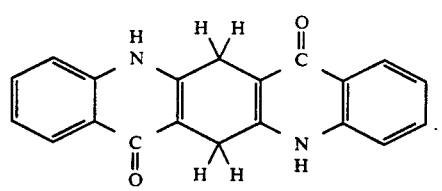
(C1)

The quinacridone compound of the above formula (A1) or (C1) is contained, at a concentration of 0.01 wt % to 10 wt %, in the fluorescent emitting layer comprising the aluminum complex of 8-hydroxyquinoline. The reason is that emission with a higher luminance can be obtained at a low applied voltage.

As the cathode, there may be used metal with a low work function and of a thickness of about 500 angstroms or more, such as aluminum, magnesium, indium, silver or alloys of the individual metals. As the anode, there may be used a conductive material with a high work function, for example, indium tin oxide (I.T.O.) of a thickness of about 1000 to 3000 angstroms, or gold of a thickness of about 800 to 1500 angstroms. The electrode employing gold as its material gets semitransparent.

As the organic positive-hole transporting layer 4, there may be used, singly or in a mixture, compounds of the following formulas (I) to (XII), known as CTM (carrier Transporting Materials).

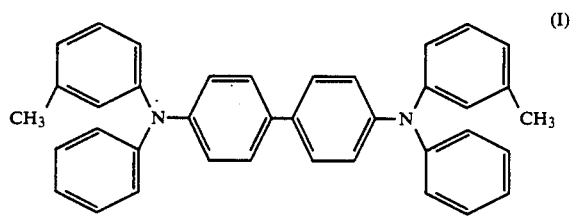
(I)

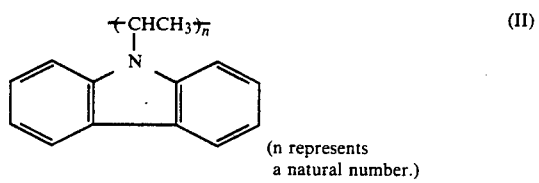
(II)

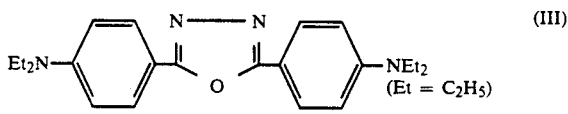
(n represents a natural number.)

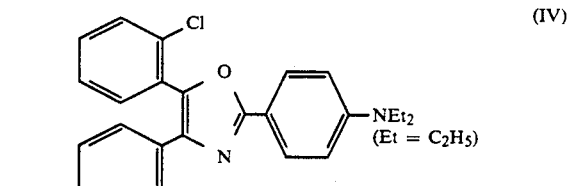
(III)
(Et = $C_2H_5$)

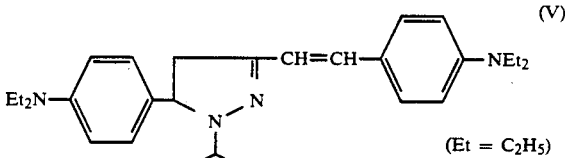
(IV)
(Et = $C_2H_5$)

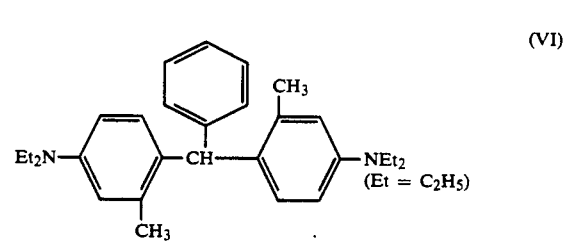
(V)
(Et = $C_2H_5$)

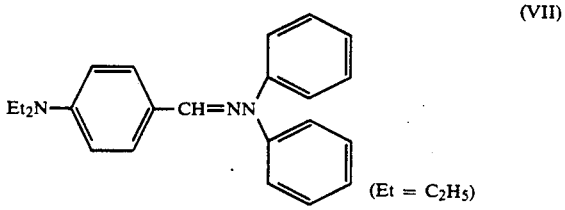
(VI)
(Et = $C_2H_5$)

(VII)
(Et = $C_2H_5$)

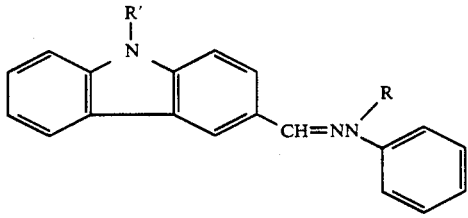

(R and R' represent alkyl groups.)

(VIII)

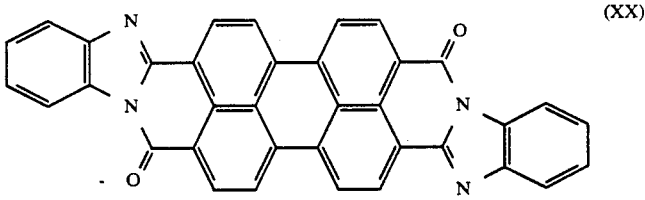

(XX)

(IX)

(Et = C₂H₅)

(X)

(R represents an alkyl group;
n represents a natural number.)

(XI)

(R represents an alkyl group)

(XII)

Figure 2:
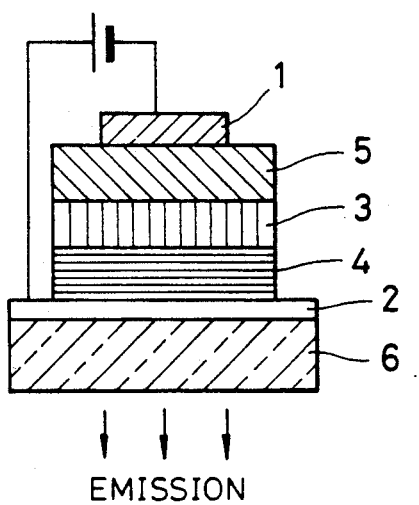

FIG. 1 shows a two-layer structures where an organic fluorescent film 3 and an organic positive-hole transporting layer 4 are arranged between a cathode 1 and an anode 2. As is shown in FIG. 2, the same effects can be produced also by an electroluminescent device of a three-layer structure where an organic electron transporting layer 5, for example, comprising perylene tetracarboxyl derivative of the following formula (XX);

is arranged between the cathode and the fluorescent film 3.

In the electroluminescent device of the present invention, a fluorescent emitting layer containing a quinacridone compound as the guest substance is held in a quinoline derivative as the host material, as has been described above, so that a highly luminent emission can be brought over at a lower applied voltage. According to the present invention, the luminous efficiency of the electroluminescent devices can be improved as well, rendering sharp the distribution pattern of the emission spectra thereof, so that the color purity of the emission color therefrom can be enhanced.

EXAMPLES

Among organic fluorescent films containing the aluminum complex of 8-hydroxyquinoline of the above formula (B) in which quinacridone of the above formula (A1) is contained and dispersed to a concentration of 0.01 wt % to 10 wt %, electroluminescent device in the structure as in FIG. 1 were fabricated as Examples 1 to 4, individually, employing the organic fluorescent films of four kinds of concentrations of 0.15 wt % to 5.5 wt % in Table 1. The film thickness of the organic fluorescent films was determined at 1 μm or less.

As the organic positive-hole transporting layer, there was used a film comprising triphenyl amine derivative of the above formula (1) and having a film thickness of 500 angstroms.

As the metal electrode as cathode, there was used a film comprising magnesium-aluminium alloy of a film thickness of 1600 angstroms.

As the transparent electrode as anode, there was used an I.T.O. film of a film thickness of 2000 angstroms.

Each of the films in such structures was formed by vacuum evaporation process, at the condition of a degree of vacuum of $1.5 \times 10^{-5}$ Torr of less and an evaporation rate of 3.5 angstroms/sec.

TABLE 1

|  | Concentration of guest material | Maximum luminance (cd/m²) |
| --- | --- | --- |
| Example 1 | 0.15 | 32460 |
| Example 2 | 0.55 | 45700 |
| Example 3 | 1.1 | 36400 |
| Example 4 | 5.5 | 3000 |

The emission spectra of the electroluminescent device of Examples 1 to 4, produced as described above, peaks at 540 nm, individually.

Figure 3:
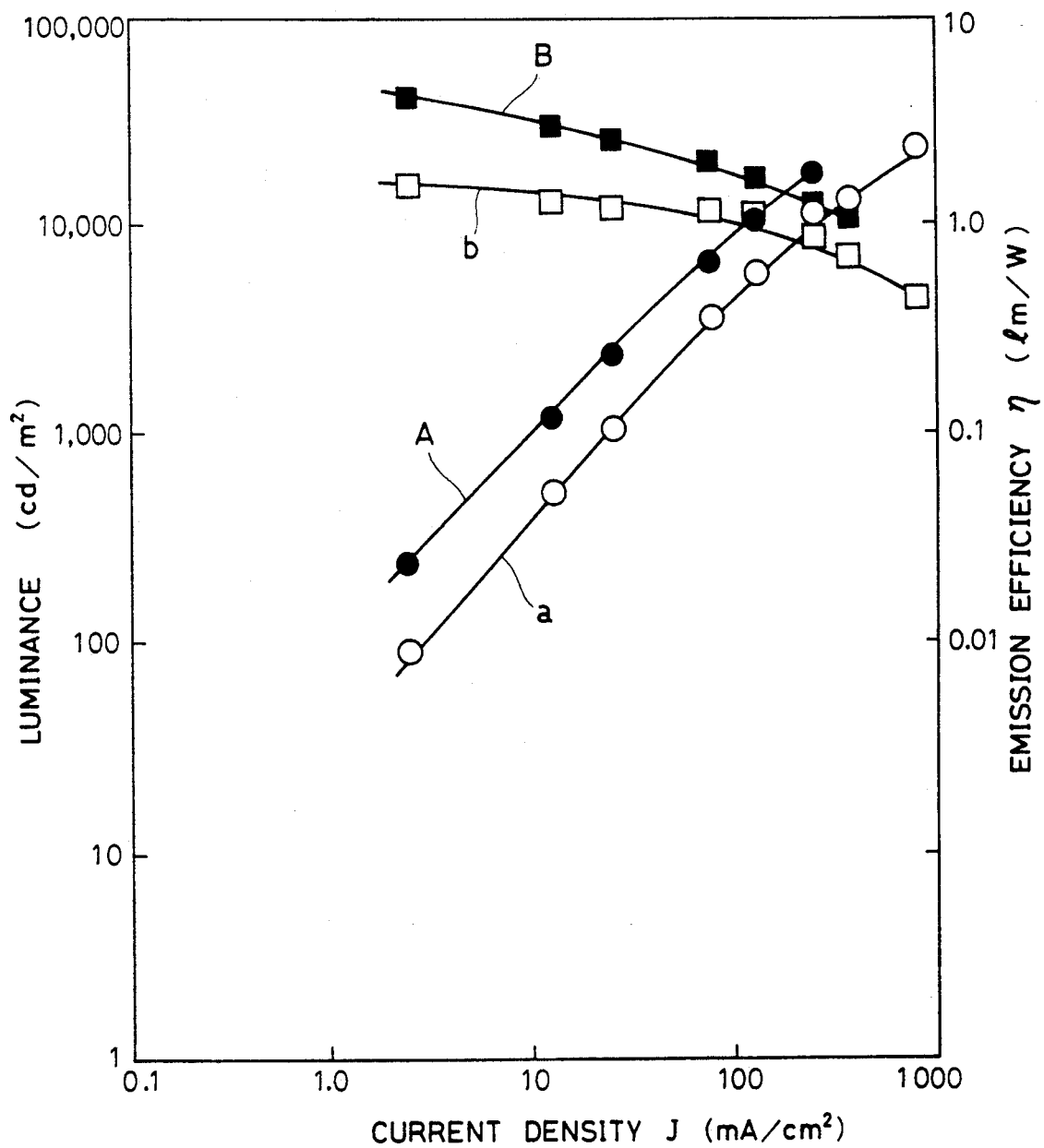
FIG. 3 are graphs representing the emission characteristics of electroluminescent devices.

The emission characteristics of the device comprising the fluorescent emitting layer containing the guest substance of 1.1 wt % concentration are shown in FIG. 3.

In FIG. 3, in relation to the current density, the symbol ● shows the change in the luminance of the electroluminescent device comprising a fluorescent film composed of a mixture of 8-hydroxyquinoline aluminum complex-quinacridone (Curve A); the symbol ■ shows the change in the luminous efficiency of the electroluminescent device comprising a fluorescent film composed of a mixture of 8-hydroxyquinoline aluminum complex-quinacridone (Curve B). The voltage- and current-specificity in the case are shown in FIG. 4, where in relation to the applied voltage, the symbol ● shows the change in the current density of the electroluminescent device comprising a fluorescent film composed of a mixture of 8-hydroxyquinoline aluminum complex-quinacridone (Curve C).

Figure 4:
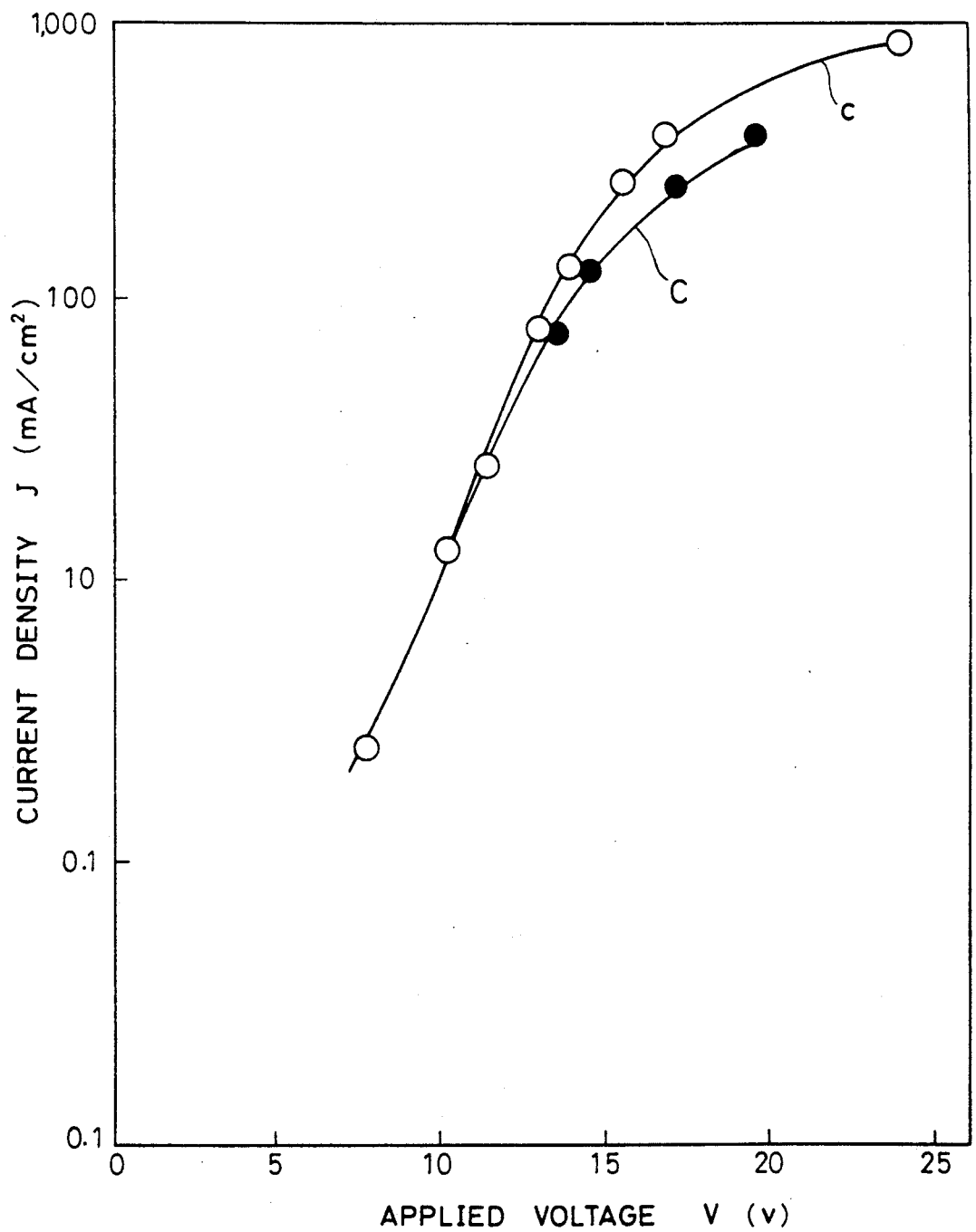
FIG. 4 are graphs representing voltage- and electric current-specificity of electroluminescent devices.

In FIGS. 3 and 4, the characteristics each regarding the changes in the luminance, luminous efficiency and current density of a conventional electroluminescent device comprising a fluorescent film composed of 8-hydroxyquinoline aluminum complex alone are shown as Curves a, b and c, in symbols ○, □, and ⬡.

As is shown in FIG. 3, the comparison of the luminous efficiency at a 1000 cd/m² luminance, concerning the conventional electroluminescent device and the device of the present Example comprising the fluorescent emitting layer composed of the guest material of a concentration of 1.1 wt %, shows that the device of the present Example exhibits the luminous efficiency $\eta = 3.2$ lm/W, while the conventional one exhibits the luminous efficiency of $\eta = 1.2$ lm/W, the emission luminance being improved by about 2.5 fold or more in the device of the present Example than in the conventional device.

Figure 5:
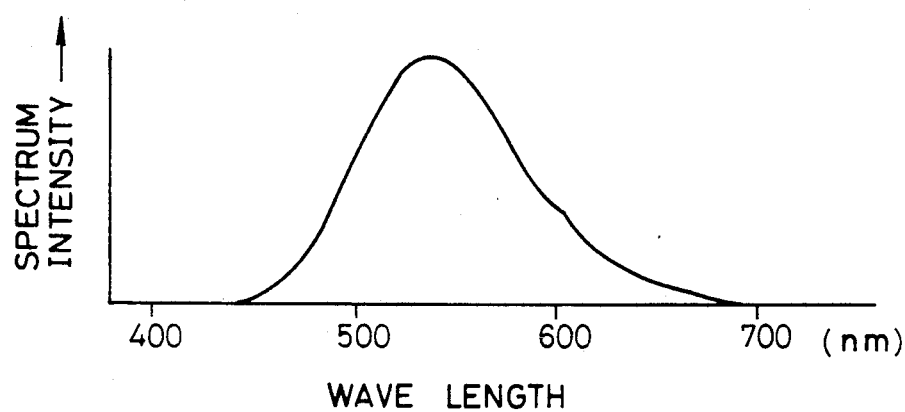
FIGS. 5 and 6 are graphs showing the distribution of emission spectra regarding electroluminescent devices.
Figure 6:
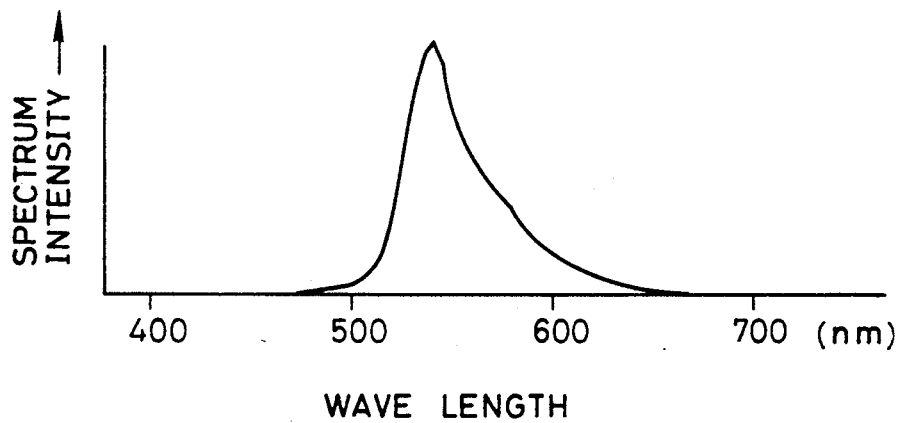

The distribution of the emission spectra, concerning the conventional electroluminescent device and the device of the present Example comprising the fluorescent emitting layer composed of the guest material of a concentration of 1.1 wt % were separately measured and shown in the graphs of FIGS. 5 and 6 representing the emission spectrum distribution. As is shown in the figures, the comparison of the distribution of the emission spectra, concerning the conventional electroluminescent device and the device of the present Example, shows that the device of the present Example exhibits a sharper distribution curve of the emission spectrum than the conventional one, so that the green color as its emission color had a color purity of $x = 0.35$ and $y = 0.62$ on the CIE Chromaticity Coordinate (1931), which was improved compared with the color purity of $x = 0.35$ and $y = 0.57$ of the conventional color.

For Example 5, at the same condition, there was fabricated an electroluminescent device of the structure shown in FIG. 1, containing an organic fluorescent film comprising the aluminum complex of 8-hydroxyquinoline of the above formula (B) in which the dehydro form of quinacridone of the above formula (C1) was contained and dispersed to a concentration of 0.7 wt %, and other functional films were identical as those in the above Example.

The maximum emission was 49,400 cd/m², having its peak at a 540 nm wave length of the emission spectrum, when the guest material concentration was 0.7 wt % in the electroluminescent device of Example 5 fabricated described above. The luminous efficiency of the device was 2.8 lm/w at 1,000 cd/m², which was increased by two fold or more than the conventional one. The color purity thereof was $x = 0.37$ and $y = 0.61$ on the CIE Chromaticity Coordinate (1931), which was improved compared with the conventional one.

What is claimed is:

1. An electroluminescent device, comprising:
   an anode;
   a positive-hole transporting layer made of an organic compound;
   a fluorescent emitting layer made of an organic compound;
   a cathode; and
   said anode, positive-hole transporting layer, fluorescent emitting layer and cathode being laminated in sequence, wherein said fluorescent emitting layer is made of a quinoline derivative and a quinacridone compound of substituted Quino[2,3-b] acridine-5,12-dihydro-7,14-dione capable of efficiently emitting light with a sharper distribution of emission spectrum upon application of a low voltage and represented by the following formula (A)

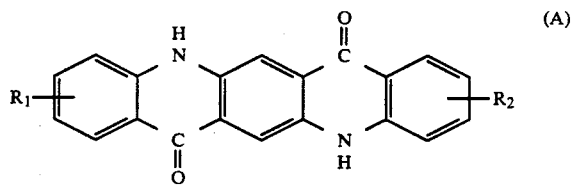

wherein $R_1$ and $R_2$ are independently hydrogen, methyl group or chlorine.

2. The electroluminescent device according to claim 1, wherein said quinoline derivative is the aluminum complex of 8-hydroxyquinoline and said quinacridone compound is quinacridone wherein $R_1$ and $R_2$ are hydrogen.

3. The electroluminescent device according to claim 1, further comprising an organic-compound electron transporting layer arranged between said cathode and said fluorescent emitting layer.

4. An electroluminescent device, comprising:
   an anode;
   a positive-hole transporting layer made of an organic compound;
   a fluorescent emitting layer made of an organic compound;
   a cathode; and
   said anode, positive-hole transporting layer, fluorescent emitting layer and cathode being laminated in sequence, wherein said fluorescent emitting layer is made of a quinoline derivative and a quinacridone compound of substituted Quino[2,3-b] acridine-5,6,12,13-tetrahydro-7,14-dione capable of efficiently emitting light with a sharper distribution of emission spectrum upon application of a low voltage and represented by the following formula (C)

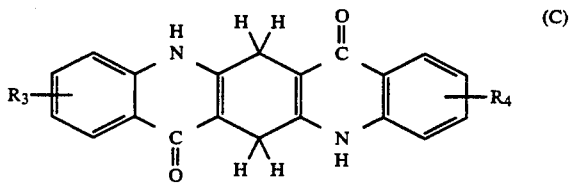

wherein $R_3$ and $R_4$ are independently hydrogen, methyl group or chlorine.

5. The electroluminescent device according to claim 4, wherein said quinoline derivative is the aluminum complex of 8-hydroxyquinoline and said quinacridone compound is quinacridone wherein $R_3$ and $R_4$ are hydrogen.

6. The electroluminescent device according to claim 4, further comprising an organic-compound electron transporting layer arranged between said cathode and said fluorescent emitting layer.

* * * * *